United States Patent
Peng et al.

(10) Patent No.: US 11,164,481 B2
(45) Date of Patent: Nov. 2, 2021

(54) METHOD AND ELECTRONIC APPARATUS FOR DISPLAYING REFERENCE LOCATIONS FOR LOCATING ECG PADS AND RECORDING MEDIUM USING THE METHOD

(71) Applicant: HTC Corporation, Taoyuan (TW)

(72) Inventors: De-Zhang Peng, Taoyuan (TW);
Huan-Hsin Li, Taoyuan (TW);
Ming-Tien Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 623 days.

(21) Appl. No.: 15/011,626

(22) Filed: Jan. 31, 2016

(65) Prior Publication Data
US 2017/0221384 A1    Aug. 3, 2017

(51) Int. Cl.
*G09B 23/28*     (2006.01)
(52) U.S. Cl.
CPC .................... *G09B 23/28* (2013.01)
(58) Field of Classification Search
CPC .... G09B 23/28; G09B 23/288; A61H 31/005; A61H 2230/40; A61H 2201/5084
See application file for complete search history.

(56) References Cited

U.S. PATENT DOCUMENTS

| | | | | |
|---|---|---|---|---|
| 7,650,181 B2* | 1/2010 | Freeman | ............... | A61H 31/00 600/484 |
| 9,707,151 B2* | 7/2017 | Woerlee | ............... | A61H 31/004 |
| 2004/0015191 A1* | 1/2004 | Otman | ............... | A61N 1/37282 607/5 |
| 2007/0299473 A1* | 12/2007 | Matos | ................. | A61N 1/0476 607/5 |
| 2010/0049037 A1* | 2/2010 | Pinter | .................. | A61B 5/0408 600/425 |
| 2010/0069735 A1* | 3/2010 | Berkner | ............. | A61B 5/04028 600/382 |
| 2010/0249542 A1* | 9/2010 | Thijs | .................. | A61B 5/02125 600/301 |
| 2011/0284004 A1* | 11/2011 | Silver | .................... | A61B 5/087 128/205.13 |
| 2012/0045742 A1* | 2/2012 | Meglan | .................. | G09B 23/28 434/268 |
| 2013/0060315 A1* | 3/2013 | Elghazzawi | ........... | A61N 1/046 607/142 |
| 2014/0005506 A1* | 1/2014 | Elghazzawi | ......... | A61B 5/0205 600/324 |

(Continued)

*Primary Examiner* — Malina D. Blaise
(74) *Attorney, Agent, or Firm* — JCIPRNET

(57) ABSTRACT

A method and an electronic apparatus for displaying reference locations for locating ECG pads and a recording medium using the method are provided. In the method, a body image is retrieved and a skin area in accordance with a skin color in the body image is detected. A feature analysis is performed on the skin area to detect two physical nipples and obtain locations of the two physical nipples in the body image. The relative locations of a plurality of ECG pads to one or two nipples predefined by medical statistics are retrieved to compute reference locations of the ECG pads in the body image according to the locations of the two physical nipples. Finally, the body image is displayed on the display and the reference locations of the ECG pads in the displayed body image are indicated.

15 Claims, 9 Drawing Sheets

(56) References Cited

U.S. PATENT DOCUMENTS

| | | | | |
|---|---|---|---|---|
| 2014/0031696 A1* | 1/2014 | Schmeitz | A61B 5/0077 | 600/473 |
| 2014/0222095 A1* | 8/2014 | Einy | A61N 1/39 | 607/5 |
| 2014/0342330 A1* | 11/2014 | Freeman | G09B 23/288 | 434/265 |
| 2014/0342331 A1* | 11/2014 | Freeman | G09B 23/288 | 434/265 |
| 2015/0043800 A1* | 2/2015 | Miyasa | G06T 17/00 | 382/131 |
| 2015/0079565 A1* | 3/2015 | Miller | G09B 23/281 | 434/252 |
| 2015/0170546 A1* | 6/2015 | Kirenko | G09B 23/30 | 434/265 |
| 2015/0194074 A1* | 7/2015 | Chen | G09B 23/288 | 434/265 |
| 2015/0273226 A1* | 10/2015 | Einy | G06Q 30/02 | 607/6 |
| 2015/0351647 A1* | 12/2015 | Dantu | A61B 5/02438 | 601/41 |
| 2016/0133160 A1* | 5/2016 | Packer | G09B 23/288 | 434/267 |
| 2019/0066538 A1* | 2/2019 | Chao | A61H 31/005 | |

* cited by examiner

METHOD AND ELECTRONIC APPARATUS FOR DISPLAYING REFERENCE LOCATIONS FOR LOCATING ECG PADS AND RECORDING MEDIUM USING THE METHOD

BACKGROUND

Heart diseases such as coronary artery disease (CAD), congestive heart failure (CHF), or bad heart rhythms are one of the most vital diseases nowadays. To avoid sudden death caused by heart diseases, doctors highly rely on electrocardiogram (ECG) to inspect heart symptoms and diagnose the heart diseases in an early stage.

ECG is a graph recording heart's electrical activity over a period of time detected by multiple electrodes placed on a patient. These electrodes may detect tiny electrical potential changes on the skin that arise from the heart muscle depolarizing during the heartbeats. In a conventional ECG measurement, the electrodes are placed on the surface of the patient's chest at specific locations around the patient's limbs. An overall magnitude of the heart's electrical potential is measured from different angles (or leads) and is recorded over a period of time. Especially for an arrhythmia, a long and lasting measurement and monitoring is required. Therefore, instead of staying in the hospital, the patient have to carry the ECG electrodes and measuring instrument back to home and do the measurement for a period of time like 24 hours so as to collect the data sufficient for the doctor to diagnose the heart disease.

However, since the ECG pads (to be connected with the electrodes) are required to be placed at specific locations on the patient's chest, the patent usually cannot put on the ECG pads correctly by themselves, but rely on assistance from the doctors or nurses every time they need to do the measurement.

SUMMARY

To assist the patients in placing ECG pads by themselves, a graphical exhibition showing the ECG pads on the body image of the patient is most helpful for locating the ECG pads. Accordingly, the disclosure provides a method and an electronic apparatus for displaying reference locations for locating ECG pads and a recording medium using the method, through which the locations of nipples are first detected and used a reference to locate the ECG pads so that the patients may put on the ECG pads correctly by themselves.

The disclosure provides a method for displaying reference locations for locating ECG pads, adapted for an electronic apparatus having a display. In the method, a body image is retrieved and a skin area in accordance with a skin color in the body image is detected. A feature analysis is performed on the skin area to detect two nipples and obtain locations of the two physical nipples in the body image. The relative locations of a plurality of ECG pads to one or two nipples predefined by medical statistics are retrieved to compute reference locations of the ECG pads in the body image according to the locations of the two physical nipples. Finally, the body image is displayed on the display and the reference locations of the ECG pads in the displayed body image are indicated.

In an example of the present disclosure, the method further comprises determining a body orientation information according to a plurality of relative location information of the two physical nipples to an outline of the skin area, and adjusting the reference locations of the ECG pads to be indicated according to the determined body orientation information.

In an example of the present disclosure, the step of determining the body orientation information according to the plurality of relative location information of the two physical nipples to the outline of the skin area comprises applying a plurality of scan lines from each of the two physical nipples to the outline of the skin area in a plurality of directions, obtaining the relative distances of each of the two physical nipples to the outline in the plurality of directions, and determining the body orientation information by comparing the obtained relative distances of the two physical nipples.

In an example of the present disclosure, the step of adjusting the reference locations of the ECG pads to be indicated according to the determined body orientation information comprises calculating a ratio of the relative distances of the two physical nipples to the outline in a corresponding direction, and scaling the computed reference locations of the ECG pads by the ratio.

In an example of the present disclosure, the method further comprises performing the feature analysis on the skin area to detect a physical navel and obtain the location of the physical navel in the body image, determining a body orientation information according to a plurality of relative location information of the physical navel to an outline of the skin area, and adjusting the reference locations of the ECG pads to be indicated according to the determined body orientation information.

In an example of the present disclosure, the step of determining the body orientation information according to the plurality of relative location information of the physical navel to the outline of the skin area comprises applying a plurality of scan lines from the physical navel to the outline of the skin area in a plurality of directions, obtaining the relative distances of the physical navel to the outline in the plurality of directions, and determining the body orientation information by comparing the obtained relative distances of the physical navel.

In an example of the present disclosure, the step of adjusting the reference locations of the ECG pads to be indicated according to the determined body orientation information comprises calculating a ratio of the relative distances of the physical navel to the outline in the directions corresponding to each other, and scaling the computed reference locations of the ECG pads by the ratio.

In an example of the present disclosure, the method further comprises capturing the body image including at least one physical ECG pad, detecting a color of each of the at least one physical ECG pad to identify a type of the physical ECG pad, comparing the location of the physical ECG pad in the body image with the computed reference location of the ECG pad corresponding to the type of the physical ECG pad to obtain and prompt a direction of moving the physical ECG pad to the reference location, and prompt the direction.

In an example of the present disclosure, the relative locations of the plurality of ECG pads to the one or two nipples comprise polar coordinates or Cartesian coordinates.

In an example of the present disclosure, the feature analysis comprises a texture analysis, a color analysis, or a combination thereof.

The disclosure provides an electronic apparatus for displaying reference locations for locating ECG pads comprising a display, a storage device and a processor. The storage device is configured to record a plurality of modules. The processor is coupled to the display and the storage device and configured to access and execute the modules recorded in the storage device. The modules comprise a body image retrieving module, a skin area detecting module, a feature analysis module, a location computing module, and a display module. The body image retrieving module is configured to retrieve a body image. The skin area detecting module is configured to detect a skin area in accordance with a skin color in the body image. The feature analysis module is configured to perform a feature analysis on the skin area to detect two physical nipples and obtain locations of the two physical nipples in the body image. The location computing module is configured to retrieve relative locations of a plurality of ECG pads to one or two nipples predefined by medical statistics to compute reference locations of the ECG pads in the body image according to the locations of the two physical nipples. The display module is configured to display the body image on the display and indicate the reference locations of the ECG pads in the displayed body image.

In an example of the present disclosure, the modules further comprise an orientation determining module and a location adjusting module. The orientation determining module is configured to determine a body orientation information according to a plurality of relative location information of the two physical nipples to an outline of the skin area. The location adjusting module is configured to adjust the reference locations of the ECG pads to be indicated according to the determined body orientation information.

In an example of the present disclosure, the orientation determining module comprises applying a plurality of scan lines from each of the two physical nipples to the outline of the skin area in a plurality of directions, obtaining the relative distances of each of the two physical nipples to the outline in the plurality of directions, and determining the body orientation information by comparing the obtained relative distances of the two physical nipples.

In an example of the present disclosure, the location adjusting module comprises calculating a ratio of the relative distances of the two physical nipples to the outline in a corresponding direction, and scaling the computed reference locations of the ECG pads by the ratio.

In an example of the present disclosure, the feature analysis module further performs the feature analysis on the skin area to detect a physical navel and obtain the location of the physical navel in the body image.

In an example of the present disclosure, the modules further comprise an orientation determining module and a location adjusting module. The orientation determining module is configured to determine a body orientation information according to a plurality of relative location information of the physical navel to an outline of the skin area. The location adjusting module is configured to adjust the reference locations of the ECG pads to be indicated according to the determined body orientation information. The orientation determining module applies a plurality of scan lines from the physical navel to the outline of the skin area in a plurality of directions, obtains the relative distances of the physical navel to the outline in the plurality of directions, and determines the body orientation information by comparing the obtained relative distances of the physical navel.

In an example of the present disclosure, the location adjusting module comprises calculating a ratio of the relative distances of the physical navel to the outline in a corresponding direction, and scaling the computed reference locations of the ECG pads by the ratio.

In an example of the present disclosure, the electronic apparatus further comprises an image capturing device, which is configured to capture the body image including at least one physical ECG pad.

In an example of the present disclosure, the modules further comprise an identification module, a comparison module and a prompt module. The identification module is configured to detect a color of each of the at least one physical ECG pad to identify a type of the physical ECG pad. The comparison module is configured to compare the location of the physical ECG pad in the body image with the computed reference location of the ECG pad corresponding to the type of the physical ECG pad to obtain a direction of moving the physical ECG pad to the reference location. The prompt module prompts the direction.

The disclosure provides a non-transitory computer readable medium for recording a computer program to be loaded by an electronic apparatus to execute steps of: retrieving a body image; detecting a skin area in accordance with a skin color in the body image; performing a feature analysis on the skin area to detect two physical nipples and obtain locations of the two physical nipples in the body image; retrieving relative locations of a plurality of ECG pads to one or two nipples predefined by medical statistics to compute reference locations of the ECG pads in the body image according to the locations of the two physical nipples; and displaying the body image on a display of the electronic apparatus and indicating the reference locations of the ECG pads in the displayed body image.

Based on the above, in the method and the electronic apparatus for displaying reference locations for locating ECG pads and the recording medium using the method provided by the present disclosure, by detecting the physical nipples in a body image of a patient, the ECG pads can be located according to the predefined relative locations of the ECG pads to the nipples, and indicated in the displayed body image, so that the user is able to quickly and correctly put on physical ECG pads through guidance given by the electronic apparatus of the present disclosure.

In order to make the aforementioned and other features and advantages of the invention more comprehensible, several examples accompanied with figures are described in detail below.

BRIEF DESCRIPTION OF THE DRAWINGS

The accompanying drawings are included to provide a further understanding of the invention, and are incorporated in and constitute a part of this specification. The drawings illustrate examples of the invention and, together with the description, serve to explain the principles of the invention.

DESCRIPTION OF EXAMPLES

In electrocardiography, there are six limb leads arranged in a coronal plane and six precordial leads lay on a transverse plane, in which the leads refer to vectors along which the heart's depolarization is measured and recorded and also used to refer to the placements of ECG electrodes. Precordial electrodes that act as positive poles for aforesaid six precordial leads and some additional precordial leads are placed at specific locations on a user's chest. Since the locations of the precordial electrodes on the chest are fixed, the nipples which also have a fixed location close to the locations of the electrodes and are easily recognized can be used as a reference to locate the ECG pads (to be connected with the electrodes) in the present disclosure. Finally, the located ECG pads along with a body image of the user are presented on an electronic apparatus so that the user may quickly and correctly locate the ECG pads through the guidance of the electronic apparatus.

Figure 1:
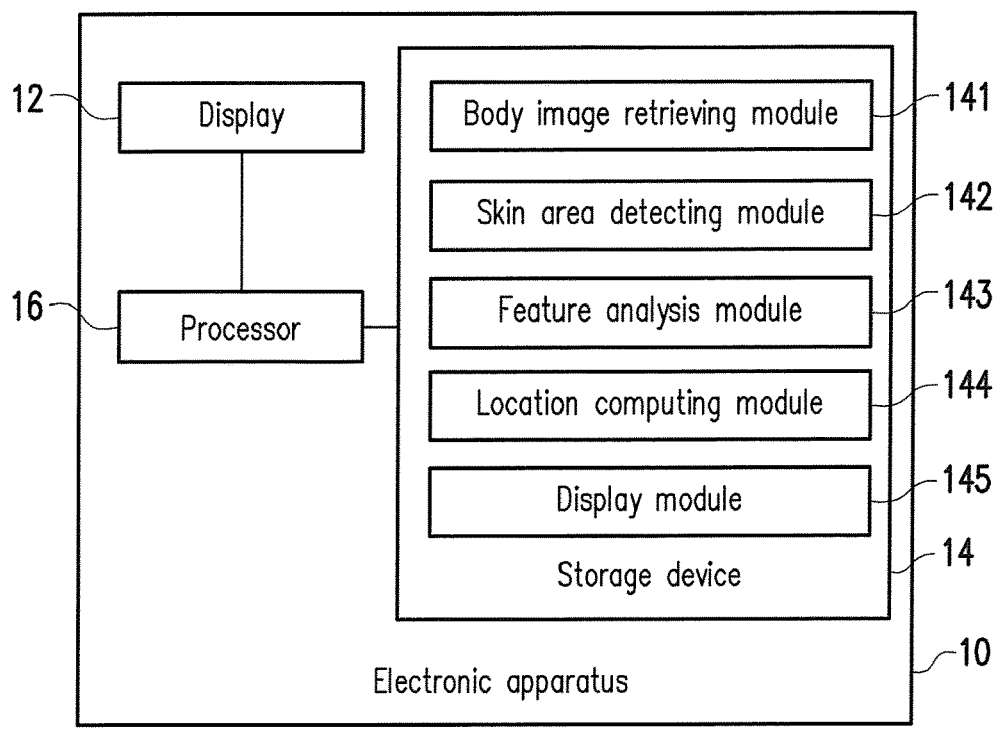
FIG. 1 is a block diagram of an electronic apparatus for displaying reference locations for locating ECG pads according to an example of the disclosure.

FIG. 1 is a block diagram of an electronic apparatus for displaying reference locations for locating ECG pads according to an example of the disclosure. With reference to FIG. 1, in the present example, the electronic apparatus 10 is, for example, a smartphone, a PDA, a tablet PC, a computer, a smart glass, a smart watch or any other stationary or portable apparatus. The electronic apparatus 10 includes a display 12, a storage device 14 and a processor 16, and functions thereof will be respectively described below.

The display 12 is, for example, a general type display, such as a liquid-crystal display (LCD), a plasma display, a vacuum fluorescent display, a light-emitting diode (LED) display, a field emission display (FED) or any other type of display. The display 12 may be integrated with touch sensing elements to form a touch screen and may detect a touch operation of a user when displaying a frame of the electronic apparatus 10.

The storage device 14 may be any type of fixed or movable random access memory (RAM), a read-only memory (ROM), a flash memory or a similar element or a combination of aforesaid elements. In the present example, the storage device 14 is configured to record a body image retrieving module 141, a skin area detecting module 142, a feature analysis module 143, a location computing module 144, and a display module 145. The aforesaid modules are, for example, programs stored in the storage device 14 which may be loaded into the processor 16 of the electronic apparatus 10, such that the processor 16 may execute an ECG pads locating function.

The processor 16 may be, for example, a central processing unit (CPU), a programmable general purpose or special purpose microprocessor, a digital signal processor (DSP), a programmable controller, an application specific integrated circuit (ASIC), a programmable logic device (PLD), or any other similar device or a combination thereof. The processor 16 is coupled to the display 12 and the storage device 14 and is configured to load the programs from the storage device 14 so as to perform the method for displaying reference locations for locating ECG pads of the disclosure. Examples describing detailed steps of the method will be described below.

Figure 2:
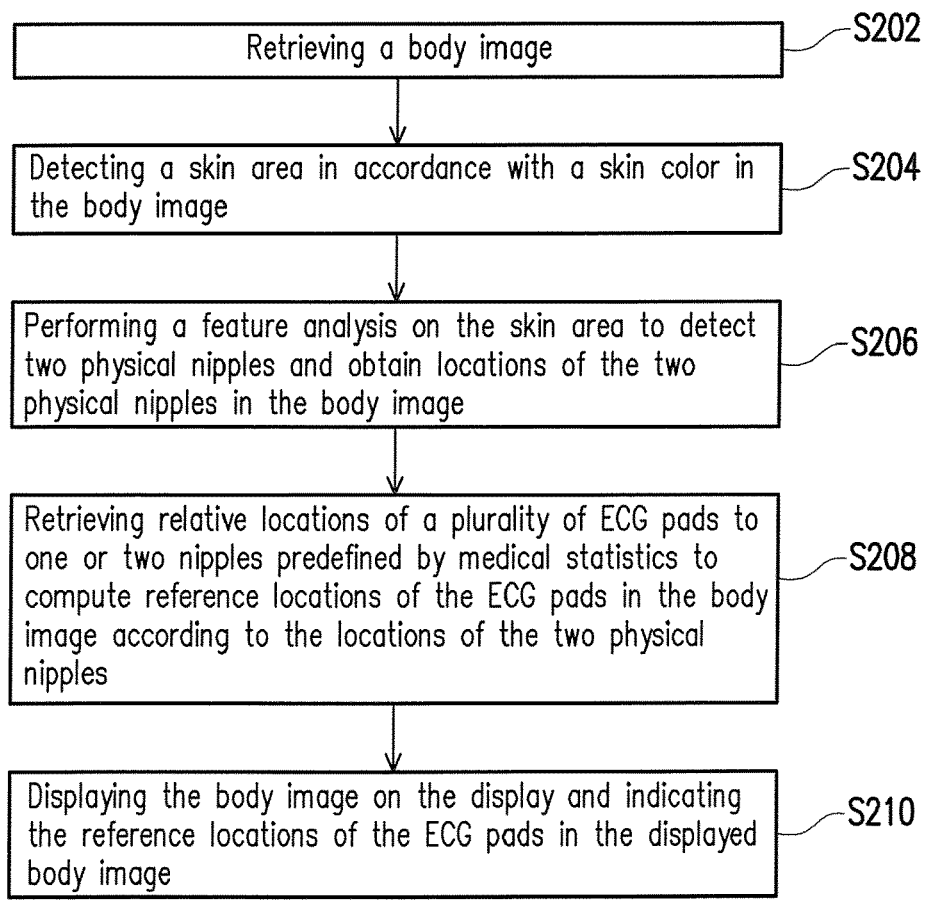
FIG. 2 is a flowchart illustrating a method for displaying reference locations for locating ECG pads according to an example of the disclosure.

FIG. 2 is a flowchart illustrating a method for displaying reference locations for locating ECG pads according to an example of the disclosure. Referring to FIG. 1 and FIG. 2 together, the method of the present example is adapted for the electronic apparatus 10 of FIG. 1. Detailed steps in the method of the present example are described below with reference to each component of the electronic apparatus 10 depicted in FIG. 1.

First, the body image retrieving module 141 retrieves a body image of a user (step S202). In detail, the body image retrieving module 141 may retrieve the body image by taking a photo of the user's chest with a camera or downloading a photo of the user's chest from a case history recorded in a medical database through Internet, which is not limited thereto.

Next, the skin area detecting module 142 detects a skin area in accordance with a skin color in the body image (step S204). In detail, since the skin area in the body image has a specific color (i.e. skin color) that can distinguish the skin area from other portions of the body image, the skin area detecting module 142 may perform color recognition on the body image to find the skin area.

Then, the feature analysis module 143 performs a feature analysis on the skin area to detect two physical nipples and obtain locations of the two physical nipples in the body image (step S206). In detail, since the physical nipples have a specific round shape and a specific darker color, the feature analysis module 143 may perform a texture analysis, a color analysis, or a combination thereof on the skin area so as to detect and locate the physical nipples. It is noted that, in another example, the electronic apparatus 10 may further provide a tool for a user to manually point or draw the location of the physical nipples so as to skip aforesaid analysis step and obtain precise locations of the physical nipples.

Afterwards, the location computing module 144 retrieves relative locations of a plurality of ECG pads to one or two nipples predefined by medical statistics to compute reference locations of the ECG pads in the body image according to the locations of the two physical nipples (step S208). The relative locations of the ECG pads to the nipple may be predefined according to the locations of ECG leads defined in electrocardiography and the locations of the nipples of regular people and may be stored in the storage device 14 so as to be retrieved by the location computing module 144. With the relative locations of the ECG pads to the nipple and the absolute location of the physical nipple, the location computing module 144 is able to compute the reference locations of the ECG pads. It is noted the relative locations of the ECG pads to the nipple may be recorded in a form of polar coordinates or Cartesian coordinates so as to present the distance and the direction of each ECG pads with respect to the nipple.

Figure 3:
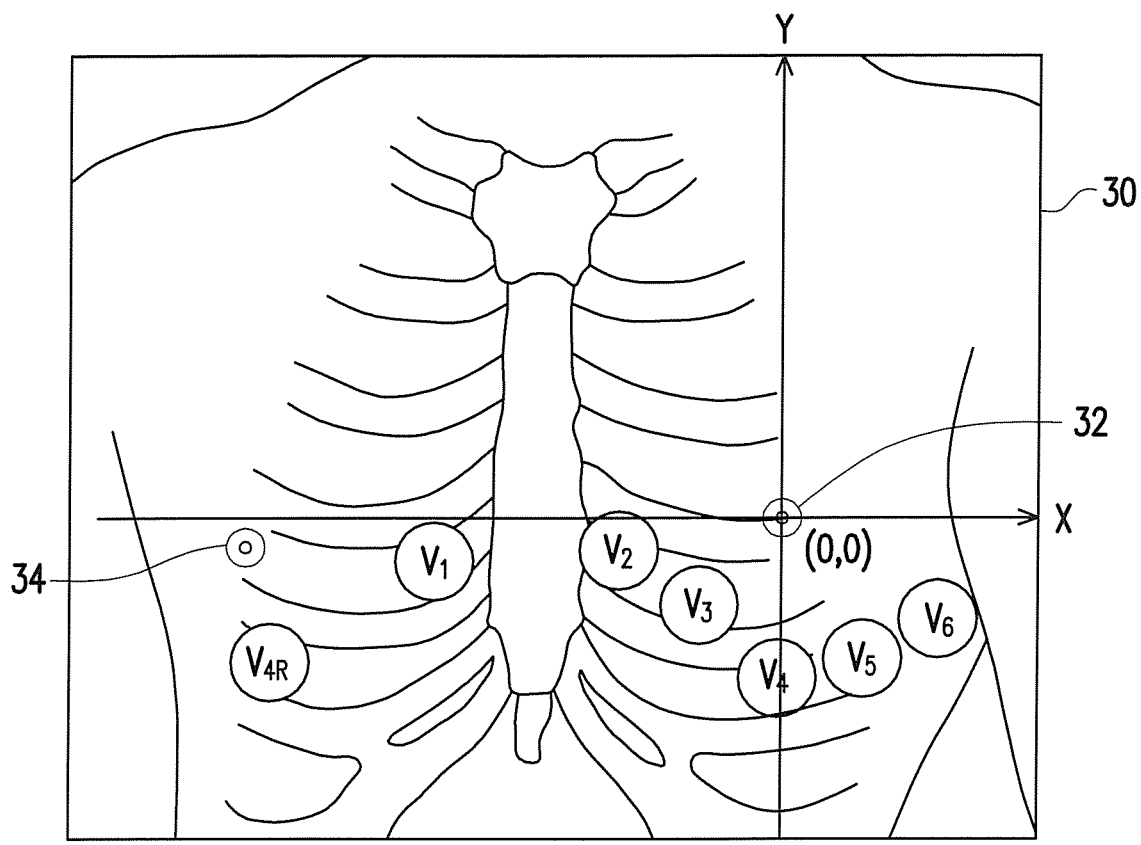
FIG. 3 is a schematic diagram illustrating relative locations of the ECG pads to the nipple according to an example of the disclosure.

For example, FIG. 3 is a schematic diagram illustrating relative locations of the ECG pads to the nipple according to an example of the disclosure. Referring to FIG. 3, a reference image 30 including two nipples 32 and 34 is provided.

The left nipple 32 is defined as an origin of a polar coordinate system or a Cartesian coordinate system with coordinates (0, 0). For the reference image 30 with a resolution of 309×250 pixels, the relative locations of ECG pads $V_1$ to $V_6$ and $V_{4R}$ to the nipple 32 may be predefined with polar coordinates or Cartesian coordinates as shown in Table 1 below. With those predefined relative locations, the electronic apparatus may compute the reference locations of the ECG pads in a later retrieved body image once the left physical nipple in the body image is located.

TABLE 1

| ECG pads | Polor coordinates | Cartesian coordinates |
|---|---|---|
| $V_1$ | (112, 187) | (−111, −14) |
| $V_2$ | (53, 192) | (−52, −11) |
| $V_3$ | (40, 227) | (−27, −29) |
| $V_4$ | (52, 269) | (−1, −52) |
| $V_5$ | (52, 300) | (26, −45) |
| $V_6$ | (58, 325) | (48, −33) |
| $V_{4R}$ | (170, 196) | (−163, −47) |

Finally, the display module 145 displays the body image on the display 12 and indicates the reference locations of the ECG pads in the displayed body image (step S210). With the indication of the ECG pads on the body image, the user may easily find the correct location of each ECG pad on his chest according to the features on his chest (e.g. nipples, nevi, or muscle lines).

Figure 4A:
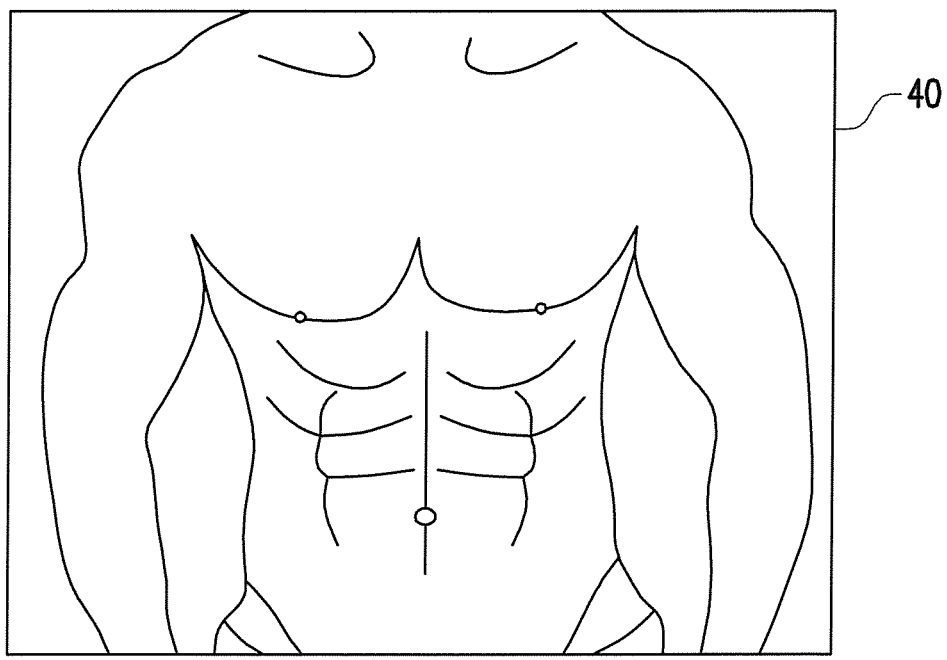
FIG. 4A to FIG. 4D are schematic diagrams illustrating an example for displaying reference locations for locating ECG pads according to an example of the disclosure.
Figure 4B:
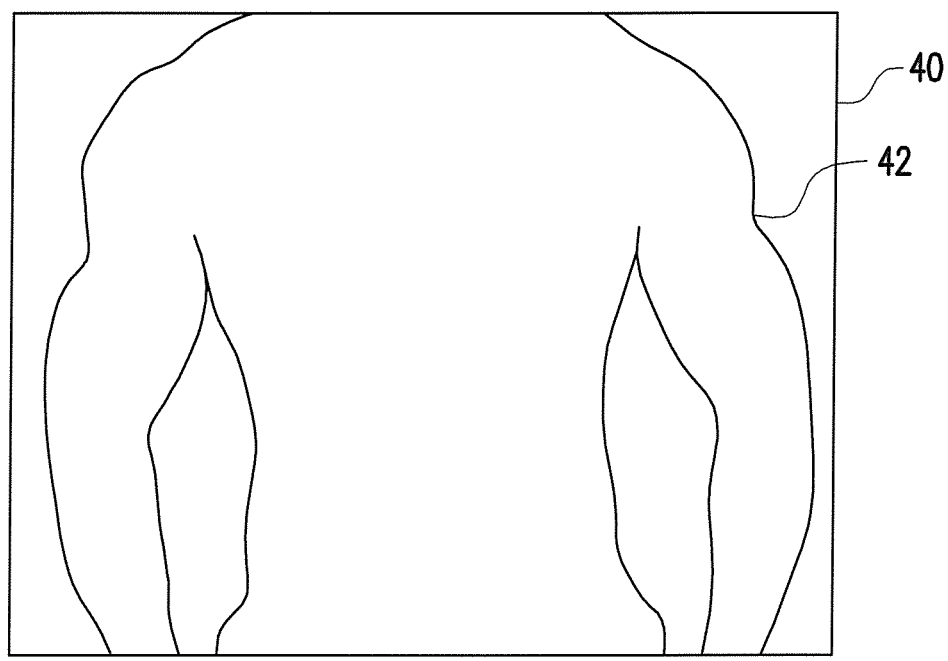
Figure 4C:
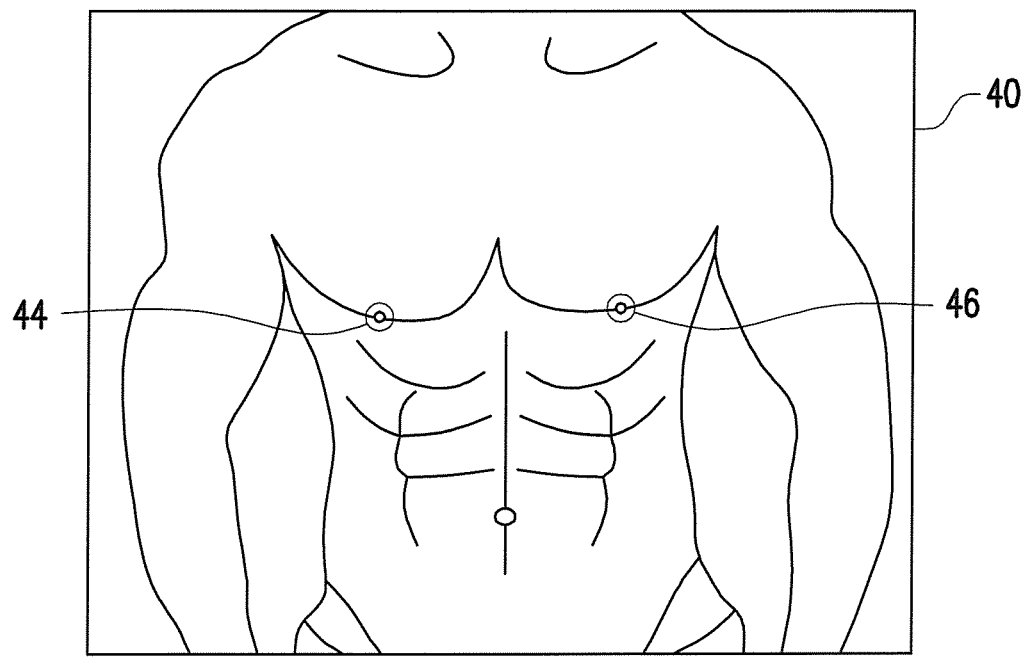
Figure 4D:
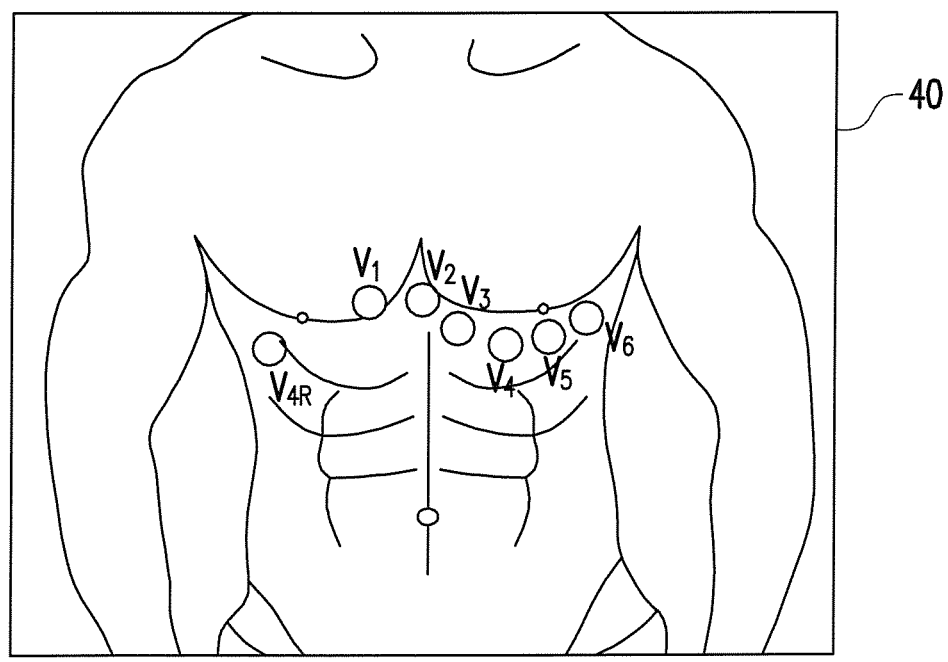

For example, FIG. 4A to FIG. 4D are schematic diagrams illustrating an example for displaying reference locations for locating ECG pads according to an example of the disclosure. Referring to FIG. 4A, a body image 40 of an upper body of a user is retrieved. A color recognition is then performed on the body image 40 to detect a skin area 42 in the body image 40 as shown in FIG. 4B. A feature analysis is further performed on the skin area 42 to detect the two physical nipples 44 and 46 as shown in FIG. 4C. Finally, the relative locations of the ECG pads $V_1$ to $V_6$ and $V_{4R}$ to the nipple predefined by medical statistics are retrieved so as to compute reference locations of the ECG pads in the body image 40 and indicate the computed reference locations of the ECG pads $V_1$ to $V_6$ and $V_{4R}$ in the body image 40 as shown in FIG. 4D so as to assist the user in locating the ECG pads.

It is noted that, in case that the user does not face exactly toward the camera which captures the body image, the locations of the ECG pads computed in aforesaid examples may not be correct. Accordingly, in other examples of the present disclosure, a body orientation is further detected according to the locations of physical nipples or physical navel in the body image. Examples are given below for further illustration.

Figure 5:
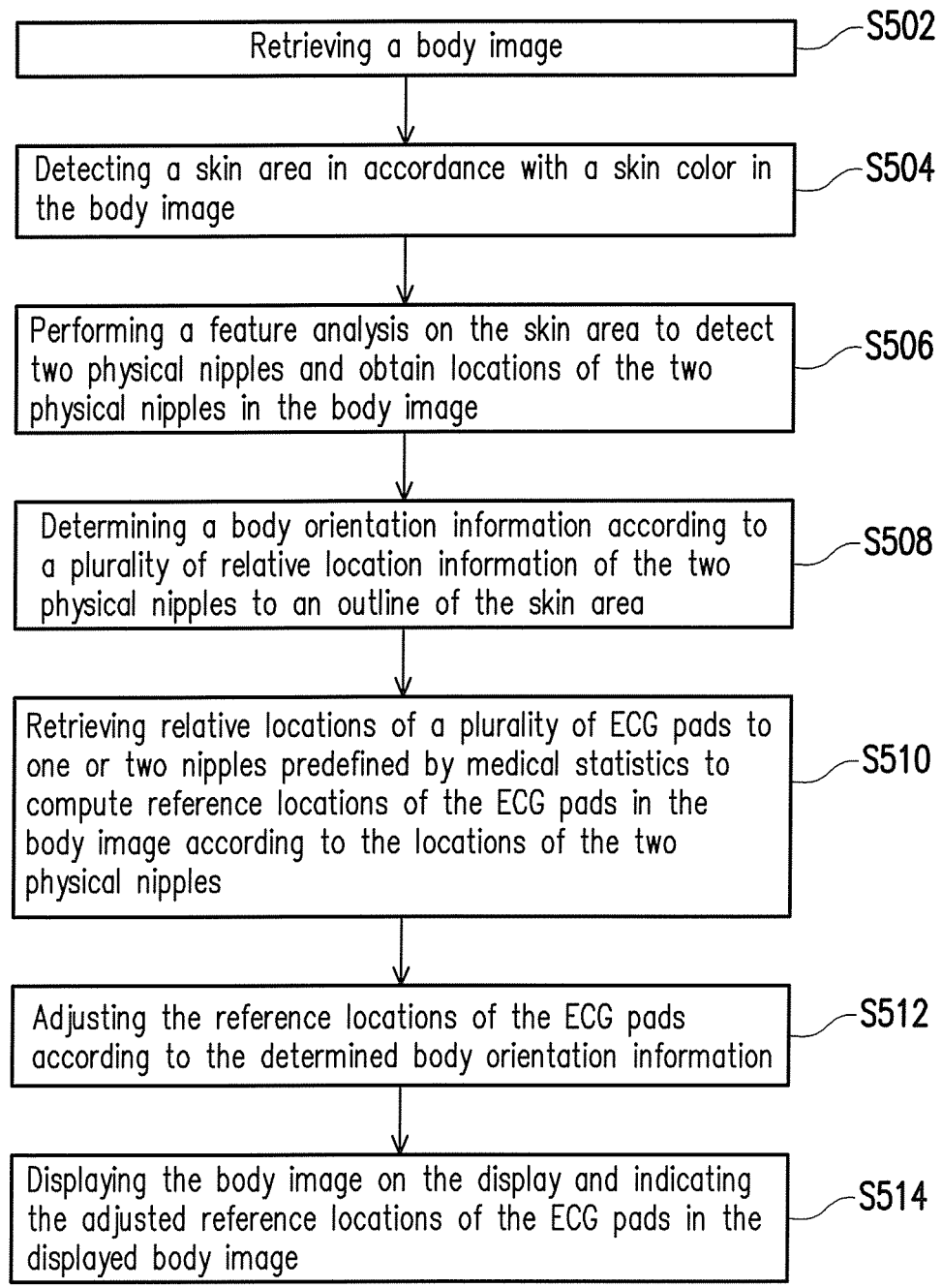
FIG. 5 is a flowchart illustrating a method for displaying reference locations for locating ECG pads according to an example of the disclosure.

FIG. 5 is a flowchart illustrating a method for displaying reference locations for locating ECG pads according to an example of the disclosure. Referring to FIG. 1 and FIG. 5 together, the method of the present example is adapted for the electronic apparatus 10 of FIG. 1. Detailed steps in the method of the present example are described below with reference to each component of the electronic apparatus 10 depicted in FIG. 1.

First, the body image retrieving module 141 retrieves a body image of a user (step S502). Next, the skin area detecting module 142 detects a skin area in accordance with a skin color in the body image (step S504). Then, the feature analysis module 143 performs a feature analysis on the skin area to detect two physical nipples and obtain locations of the two physical nipples in the body image (step S506). Steps S502 to S506 described above are the same as or similar to steps S202 to S206 of the preceding example and thus, detailed contents will not be repeated.

Different from the preceding example, in the present example, the modules stored in the storage device 14 further include an orientation determining module and a location adjusting module (not shown), which can be loaded by the processor 16 to perform the method for locating ECG pads.

In detail, after the locations of physical nipples are obtained, the orientation determining module determines a body orientation information according to a plurality of relative location information of the two physical nipples to an outline of the skin area (step S508). The orientation determining module may apply a plurality of scan lines from each of the two physical nipples to the outline of the skin area in multiple directions, obtains the relative distances of each of the two physical nipples to the outline in the directions, and determines the body orientation information by comparing the obtained relative distances of the two physical nipples.

Figure 6:
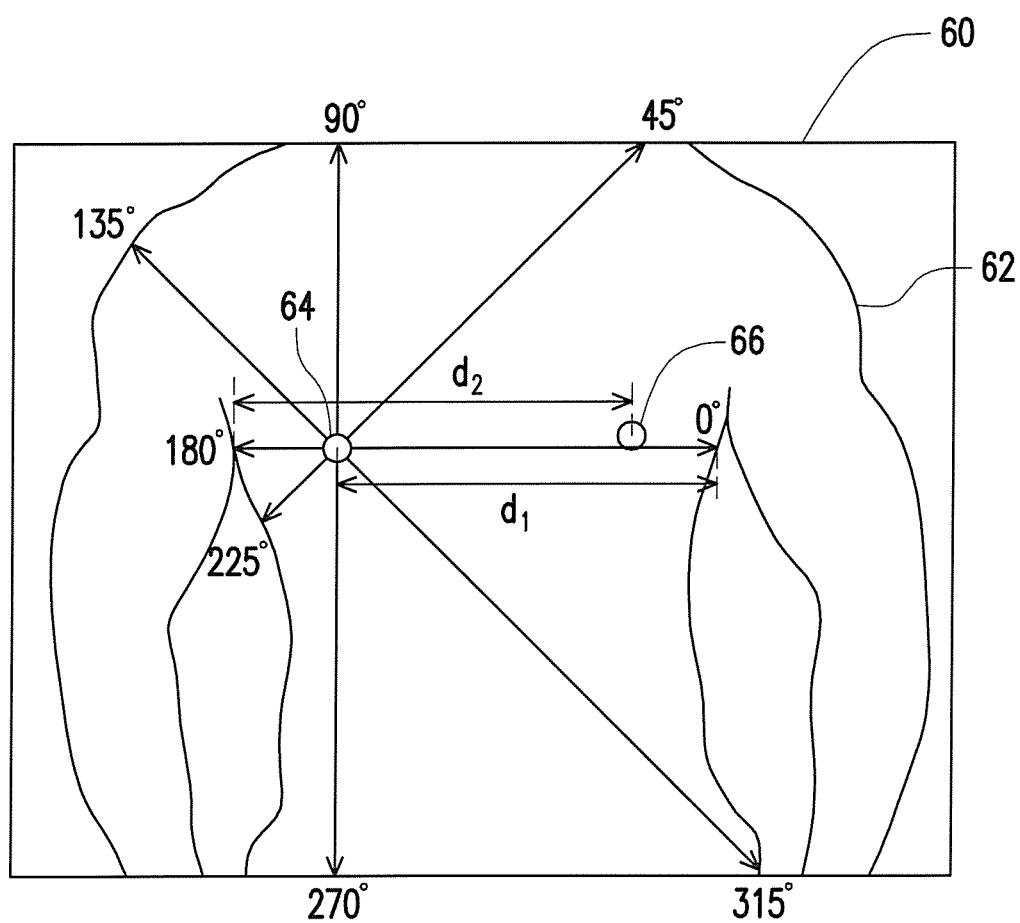
FIG. 6 is schematic diagram illustrating an example for detecting a body orientation according to an example of the present disclosure.

For example, FIG. 6 is schematic diagram illustrating an example for detecting a body orientation according to an example of the present disclosure. Referring to FIG. 6, a body image 60 of an upper body of a user with a detected skin area 62 is given and two physical nipples 64 and 66 are detected. As for the right physical nipple 64, a plurality of scan lines are applied from the nipple 64 to the outline of the skin area in eight directions with angles of 0, 45, 90, 135, 180, 225, 270, 315 degrees. The relative distances of the physical nipple 64 to the outline in those directions are obtained and used to determine the body orientation information. For example, the relative distance d1 of the physical nipple 64 to the outline in a direction with an angle of 0 degree is compared with the relative distance d2 of the physical nipple 66 to the outline in a direction with an angle of 180 degree to determine the body orientation. In one example, a ratio of the relative distances d1 and d2 is used as the body orientation information, in which if the ratio is larger than 1, it represents that the body turns to a right side; and if the ratio is smaller than 1, it represents that the body turns to a left side.

Returning back to the flow in FIG. 5, the location computing module 144 retrieves relative locations of a plurality of ECG pads to one or two physical nipples to compute reference locations of the ECG pads in the body image according to the locations of the two physical nipples (step S510), and then the location adjusting module adjusts the reference locations of the ECG pads to be indicated according to the body orientation information determined by the orientation determining module (step S512). In detail, the location adjusting module may calculate a ratio of the relative distances of the two physical nipples to the outline in a corresponding direction, and scales the computed reference locations of the ECG pads according to the calculated ratio.

Finally, the display module 145 displays the body image on the display 12 and indicates the ECG pads in the displayed body image according to the adjusted reference locations (step S514). With the adjusted locations of the ECG pads, the user may find the correct location of each ECG pad even though he/she does not face exactly toward the camera when the body image is taken.

Figure 7:
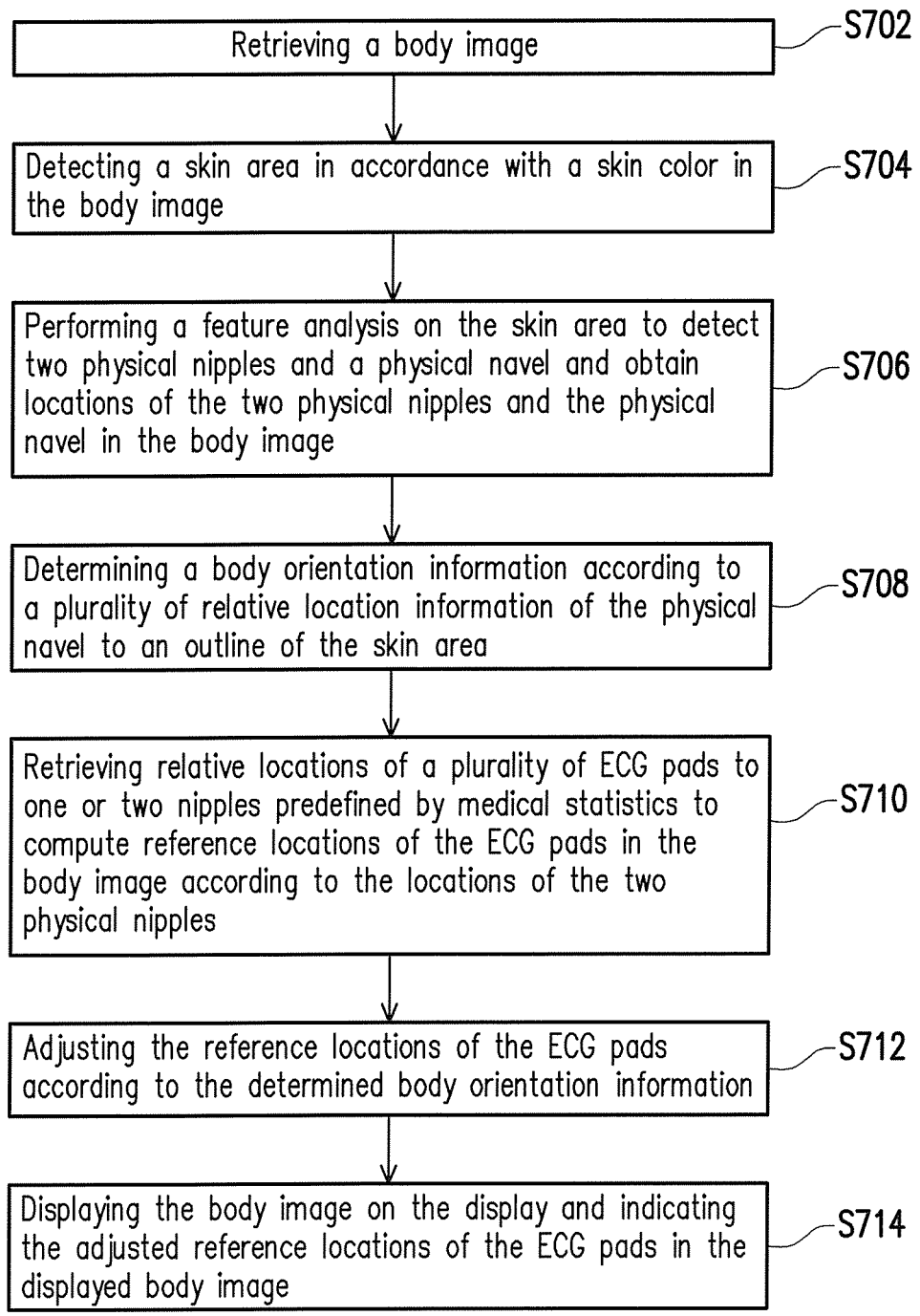
FIG. 7 is a flowchart illustrating a method for displaying reference locations for locating ECG pads according to an example of the disclosure.

In another example, FIG. 7 is a flowchart illustrating a method for displaying reference locations for locating ECG pads according to an example of the disclosure. Referring to FIG. 1 and FIG. 7 together, the method of the present example is adapted for the electronic apparatus 10 of FIG. 1. Detailed steps in the method of the present example are described below with reference to each component of the electronic apparatus 10 depicted in FIG. 1.

First, the body image retrieving module 141 retrieves a body image of a user (step S702). Next, the skin area detecting module 142 detects a skin area in accordance with a skin color in the body image (step S704). Steps S702 to S704 described above are the same as or similar to steps S202 to S204 of the preceding example and thus, detailed contents will not be repeated.

Different from the preceding example, in the present example, the feature analysis module 143 performs a feature analysis on the skin area to detect either the two physical nipples or a physical navel and obtain locations of the two physical nipples and the physical navel in the body image (step S706). It is noted, beside the physical nipples, the physical navel also have a specific shape and a specific darker color, and therefore the feature analysis module 143 may perform a texture analysis, a color analysis, or a combination thereof on the skin area so as to detect and locate the physical navel.

It is noted that, in the present example, the modules stored in the storage device 14 further include an orientation determining module and a location adjusting module (not shown), which can be loaded by the processor 16 to perform the method for locating ECG pads. After the locations of the physical nipples and the physical navel are obtained, the orientation determining module determines a body orientation information according to a plurality of relative location information of the physical navel to an outline of the skin area (step S708). In detail, the orientation determining module may apply a plurality of scan lines from the physical navel to the outline of the skin area in multiple directions, obtains the relative distances of the physical navel to the outline in the directions, and determines the body orientation information by comparing the obtained relative distances of the physical navel.

Figure 8:
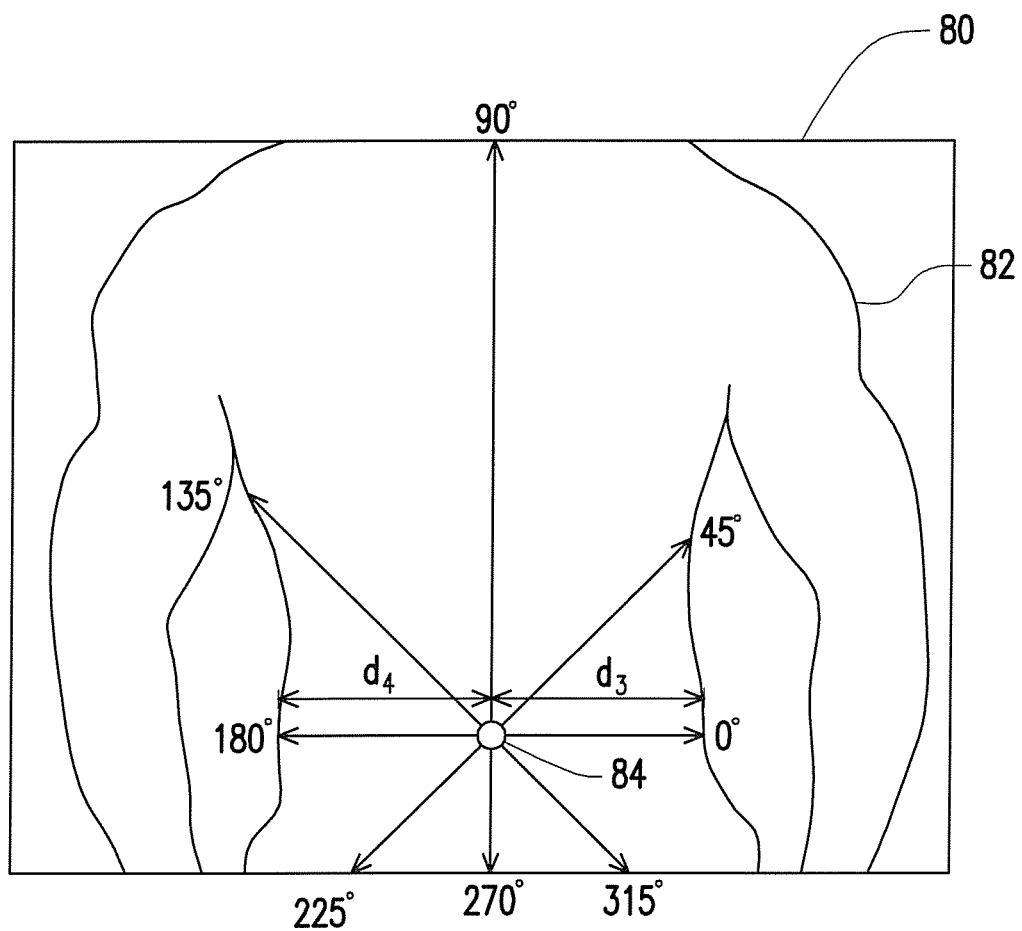
FIG. 8 is schematic diagram illustrating an example for detecting a body orientation according to an example of the present disclosure.

For example, FIG. 8 is schematic diagram illustrating an example for detecting a body orientation according to an example of the present disclosure. Referring to FIG. 8, a body image 80 of an upper body of a user with a detected skin area 82 is given and a physical navel 84 detected. A plurality of scan lines are applied from the physical navel 84 to the outline of the skin area in eight directions with angles such as 0, 45, 90, 135, 180, 225, 270, 315 degrees. The relative distances of the physical navel 84 to the outline in those directions are obtained and used to determine the body orientation information. For example, the relative distance d3 of the physical navel 84 to the outline in a direction with an angle of 0 degree is compared with the relative distance d4 of the physical navel 84 to the outline in a direction with an angle of 180 degree to determine the body orientation. In one example, a ratio of the relative distances d3 and d4 is used as the body orientation information, in which if the ratio is larger than 1, it represents that the body turns to a right side; and if the ratio is smaller than 1, it represents that the body turns to a left side.

Returning back to the flow in FIG. 7, the location computing module 144 retrieves relative locations of a plurality of ECG pads to one or two nipples predefined by medical statistics to compute reference locations of the ECG pads in the body image according to the locations of the two physical nipples (step S710), and then the location adjusting module adjusts the reference locations of the ECG pads to be indicated according to the body orientation information determined by the orientation determining module (step S712).

Finally, the display module 145 displays the body image on the display 12 and indicates the adjusted reference locations of the ECG pads in the displayed body image (step S714). With the adjusted locations of the ECG pads, the user may find the correct location of each ECG pad even though he/she does not face exactly toward the camera when the body image is taken.

In addition to display the ECG pads, the electronic apparatus of the present disclosure may further capture an image or a video of the user attaching a physical ECG pad in realtime and compare the location of the physical ECG pad being attached by the user and the location of a corresponding ECG pad computed in aforesaid method, so as to prompt the user of a direction of moving the physical ECG pad to a correct location. Examples are given below for further illustration.

Figure 9:
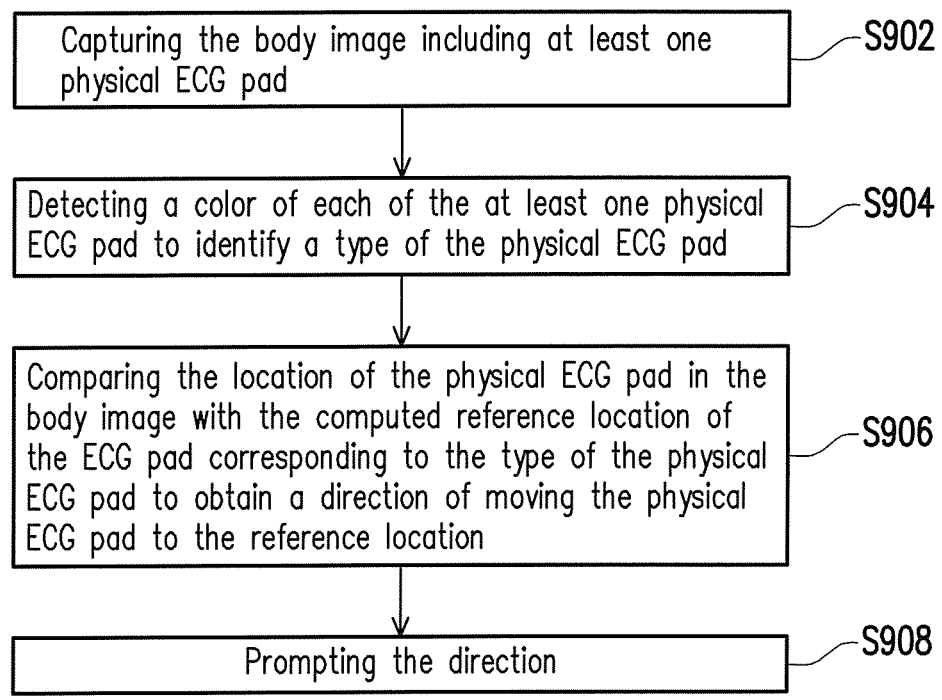
FIG. 9 is a flowchart illustrating a method for displaying reference locations for locating ECG pads according to an example of the disclosure.

FIG. 9 is a flowchart illustrating a method for displaying reference locations for locating ECG pads according to an example of the disclosure. Referring to FIG. 1 and FIG. 9 together, the method of the present example is adapted for the electronic apparatus 10 of FIG. 1. Detailed steps in the method of the present example are described below with reference to each component of the electronic apparatus 10 depicted in FIG. 1.

Different from the preceding examples, in the present example, the electronic apparatus 10 further includes an image capturing device (not shown) and the modules stored in the storage device 14 further include an identification module, a comparison module and a prompt module (not shown), which can be loaded by the processor 16 to perform the method for displaying reference locations for locating ECG pads. The image capturing device may include an optical fixed-focus lens or an optical zoom lens, and an optical sensing element such as a charge coupled device (CCD) or a complementary metal-oxide semiconductor (CMOS). It should be noted that, the image capturing device may also be a camera or a camcorder coupled to the electronic apparatus 10 in any manner.

It is also noted that, in one example, the method of the present example may follow the step S208 in FIG. 2, in which the reference locations of the ECG pads are first computed and then a body image currently captured by the image capturing device is used to identify the physical ECG pads currently operated by the user and prompt a direction for moving the physical ECG pad. In another example, the method of the present example may integrate with the flow in FIG. 2, in which the body image retrieved in step S202 is the body image captured by the image capturing device when the user attaches the physical ECG pad.

First, the image capturing device captures the body image including at least one physical ECG pad (step S902), in which the physical ECG pad appeared in the captured body image may be the ECG pad that has already been attached to the user's chest or is currently operated by the user.

It is noted that, for identification purpose, the physical ECG pads are manufactured in specific colors and therefore it is easy to identify the type of the physical ECG pad appeared in the captured body image. Accordingly, the identification module detects a color of each of the at least one physical ECG pad captured by the image capturing device so as to identify a type of the physical ECG pad (step S904).

Then, the comparison module compares the location of the physical ECG pad in the body image with the computed reference location of the ECG pad corresponding to the type of the ECG pad to obtain a direction of moving the physical ECG pad to the reference location (step S906). Finally, the prompt module prompts the direction (step S908). The prompt module may prompt the direction in any type of visual, acoustic or touch sensing manner, which is not limited herein.

Figure 10:
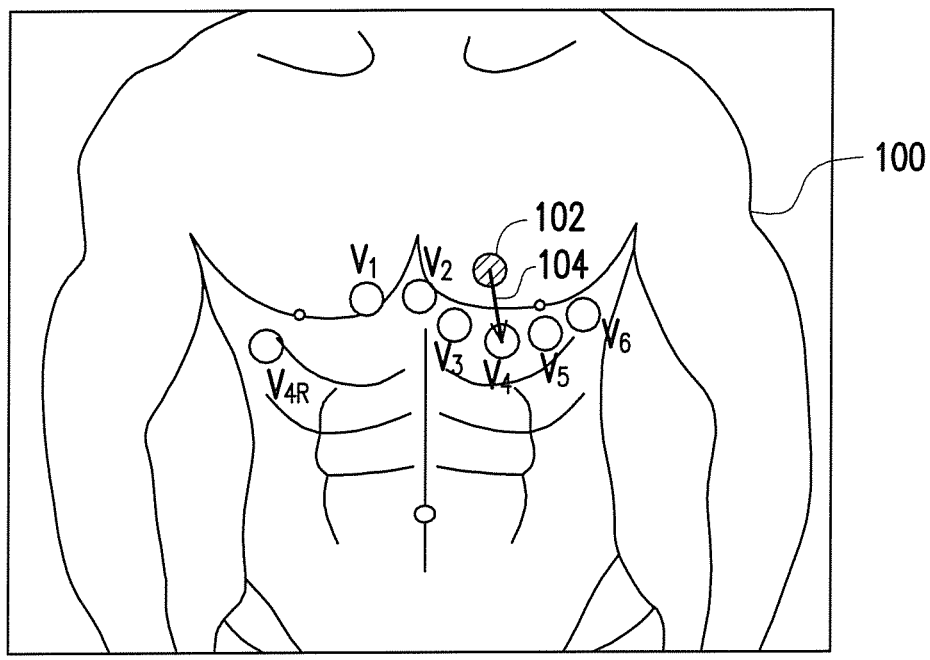
FIG. 10 is a schematic diagram illustrating an example for prompting a direction of moving the physical ECG according to an example of the disclosure.

For example, FIG. 10 is a schematic diagram illustrating an example for prompting a direction of moving the physical ECG according to an example of the disclosure. Referring to FIG. 10, a body image 100 of a user is captured and the ECG pads $V_1$ to $V_6$ and $V_{4R}$ are indicated in the body image according to the reference locations computed through preceding method. In addition to the virtually displayed ECG pads, a physical ECG pad 102 that is actually appeared in the captured body image 100 is detected and a type of the physical ECG pad 102 is further identified according to the color of the physical ECG pad 102. The location of the physical ECG pad 102 is then compared with the computed reference location of the ECG pad $V_4$ that is corresponding to the type of the physical ECG pad 102 to obtain a direction of moving the physical ECG pad 102 to the reference location of the ECG pad $V_4$. Finally, the direction is prompted in the displayed body image 100 in a form of directional indicator 104. Accordingly, the user may know how to move the physical ECG pad 102 to the right location. As a result, the user is able to quickly and correctly attach the physical ECG pads on his chest through the guidance of the electronic apparatus.

The present disclosure further provides a non-transitory computer readable medium in which a computer program is record. The computer program is used to execute each step in the method for displaying reference locations for locating ECG pads as described above. The computer program is composed of a plurality of program code sections (i.e., building an organization diagram program code section, approving a list program code section, setting a program code section, and deploying a program code section). Moreover, after the program code sections are loaded into the electronic apparatus and executed, the steps in the method may be implemented.

To sum up, in the method and the electronic apparatus for displaying reference locations for locating ECG pads and a recording medium using the method provided by the disclosure, the relative locations of the ECG pads to the nipples are predefined and stored in the electronic apparatus such that when a body image is retrieved, the ECG pads can be located according to the predefined relative locations of the ECG pads and the locations of the physical nipples in the body image. The ECG pad currently attached by the user may be tracked through color recognition and the comparison with the computed location of the corresponding ECG pad. As a result, the physical ECG pads with respect to the body image may be indicated and a direction for moving the currently operated ECG pad may be prompted, so that the user is able to quickly and correctly put on the ECG pads through the guidance given by the electronic apparatus of the present disclosure.

Although the invention has been described with reference to the above examples, it will be apparent to one of the ordinary skill in the art that modifications to the described example may be made without departing from the spirit of the invention. Accordingly, the scope of the invention will be defined by the attached claims not by the above detailed descriptions.

What is claimed is:

1. A method for displaying reference locations for locating ECG pads, adapted for an electronic apparatus having a display and a processor, comprising:
   retrieving, by the processor, a body image of a user facing toward an image capturing device which captures the body image, wherein the body image includes at least one physical ECG pad;
   performing, by the processor, color recognition on the body image to detect a skin area in accordance with a skin color in the body image, and detect a color of each of the at least one physical ECG pad to identify a type of the physical ECG pad;
   performing, by the processor, a texture analysis using a shape of physical nipples and a color analysis using a color of the physical nipples on the skin area to detect two physical nipples and obtain locations of the two physical nipples in the body image;
   retrieving, by the processor, relative locations of a plurality of ECG pads to one or two nipples predefined according to the locations of ECG leads defined in electrocardiography and medical statistics of the locations of the nipples of a plurality of people to compute reference locations of the ECG pads in the body image corresponding to the type of the physical ECG pad according to the locations of the two physical nipples;
   determining, by the processor, a body orientation information according to a plurality of relative location information of the two physical nipples to an outline of the skin area;
   adjusting, by the processor, the reference locations of the ECG pads according to the determined body orientation information;
   comparing, by the processor, the location of the physical ECG pad in the body image with the reference location of the ECG pad corresponding to the type of the physical ECG pad to obtain a direction of moving the physical ECG pad to the reference location; and
   prompting, by the processor, the direction.

2. The method according to claim 1, wherein the step of determining the body orientation information according to the plurality of relative location information of the two physical nipples to the outline of the skin area comprises:
   applying a plurality of scan lines from each of the two physical nipples to the outline of the skin area in a plurality of directions;
   obtaining the relative distances of each of the two physical nipples to the outline in the plurality of directions; and
   determining the body orientation information by comparing the obtained relative distances of the two physical nipples.

3. The method according to claim 2, wherein the step of adjusting the reference locations of the ECG pads to be indicated according to the determined body orientation information comprises:
   calculating a ratio of the relative distances of the two physical nipples to the outline in a corresponding direction; and
   scaling the computed reference locations of the ECG pads by the ratio.

4. The method according to claim 1, further comprising:
   performing a texture analysis using a shape of a physical navel and a color analysis using a color of the physical navel on the skin area to detect the physical navel and obtain the location of the physical navel in the body image;

determining a body orientation information according to a plurality of relative location information of the physical navel to an outline of the skin area; and adjusting the reference locations of the ECG pads to be indicated according to the determined body orientation information.

5. The method according to claim 4, wherein the step of determining the body orientation information according to the plurality of relative location information of the physical navel to the outline of the skin area comprises:

applying a plurality of scan lines from the physical navel to the outline of the skin area in a plurality of directions;

obtaining the relative distances of the physical navel to the outline in the plurality of directions; and determining the body orientation information by comparing the obtained relative distances of the physical navel.

6. The method according to claim 5, wherein the step of adjusting the reference locations of the ECG pads to be indicated according to the determined body orientation information comprises:

calculating a ratio of the relative distances of the physical navel to the outline in the directions corresponding to each other; and scaling the computed reference locations of the ECG pads by the ratio.

7. The method according to claim 1, wherein the relative locations of the plurality of ECG pads to the one or two nipples comprise polar coordinates or Cartesian coordinates.

8. An electronic apparatus for displaying reference locations for locating ECG pads, comprising:

a display;

a storage device, configured to record a plurality of modules; and a processor, coupled to the display and the storage device and configured to access and execute the modules recorded in the storage device to retrieve a body image of a user facing toward an image capturing device which captures the body image, wherein the body image includes at least one physical ECG pad;

perform color recognition on the body image to detect a skin area in accordance with a skin color in the body image, and detect a color of each of the at least one physical ECG pad to identify a type of the physical ECG pad;

perform a texture analysis using a shape of physical nipples and a color analysis using a color of the physical nipples on the skin area to detect two physical nipples and obtain locations of the two physical nipples in the body image;

retrieve relative locations of a plurality of ECG pads to one or two nipples predefined according to the locations of ECG leads defined in electrocardiography and medical statistics of the locations of the nipples of a plurality of people to compute reference locations of the ECG pads in the body image corresponding to the type of the physical ECG pad according to the locations of the two physical nipples;

determine a body orientation information according to a plurality of relative location information of the two physical nipples to an outline of the skin area;

adjust the reference locations of the ECG pads according to the determined body orientation information;

compare the location of the physical ECG pad in the body image with the reference location of the ECG pad corresponding to the type of the physical ECG pad to obtain a direction of moving the physical ECG pad to the reference location; and prompt the direction.

9. The electronic apparatus according to claim 8, wherein the processor applies a plurality of scan lines from each of the two physical nipples to the outline of the skin area in a plurality of directions, obtains the relative distances of each of the two physical nipples to the outline in the plurality of directions, and determines the body orientation information by comparing the obtained relative distances of the two physical nipples.

10. The electronic apparatus according to claim 9, wherein the processor calculates a ratio of the relative distances of the two physical nipples to the outline in a corresponding direction, and scales the computed reference locations of the ECG pads by the ratio.

11. The electronic apparatus according to claim 8, wherein the processor further performs a texture analysis using a shape of a physical navel and a color analysis using a color of the physical navel on the skin area to detect the physical navel and obtain the location of the physical navel in the body image.

12. The electronic apparatus according to claim 11, wherein the processor further determines a body orientation information according to a plurality of relative location information of the physical navel to an outline of the skin area; and adjusts the reference locations of the ECG pads to be indicated according to the determined body orientation information, wherein the processor applies a plurality of scan lines from the physical navel to the outline of the skin area in a plurality of directions, obtains the relative distances of the physical navel to the outline in the plurality of directions, and determines the body orientation information by comparing the obtained relative distances of the physical navel.

13. The electronic apparatus according to claim 12, wherein the processor calculates a ratio of the relative distances of the physical navel to the outline in a corresponding direction, and scales the computed reference locations of the ECG pads by the ratio.

14. The electronic apparatus according to claim 8, further comprising:

an image capturing device, configured to capture the body image including at least one physical ECG pad.

15. A non-transitory computer readable medium for recording a computer program to be loaded by a processor of an electronic apparatus to execute steps of:

retrieving a body image of a user facing toward an image capturing device which captures the body image, wherein the body image includes at least one physical ECG pad;

performing color recognition on the body image to detect a skin area in accordance with a skin color in the body image, and detect a color of each of the at least one physical ECG pad to identify a type of the physical ECG pad;

performing a texture analysis using a shape of physical nipples and a color analysis using a color of the physical nipples on the skin area to detect two physical nipples and obtain locations of the two physical nipples in the body image;

retrieving relative locations of a plurality of ECG pads to one or two nipples predefined according to the locations of ECG leads defined in electrocardiography and medical statistics of the locations of the nipples of a plurality of people to compute reference locations of the ECG pads in the body image corresponding to the type of the physical ECG pad according to the locations of the two physical nipples;

determining a body orientation information according to a plurality of relative location information of the two physical nipples to an outline of the skin area;

adjusting the reference locations of the ECG pads according to the determined body orientation information;

comparing the location of the physical ECG pad in the body image with the reference location of the ECG pad corresponding to the type of the physical ECG pad to obtain a direction of moving the physical ECG pad to the reference location; and prompting the direction.

* * * * *